United States Patent [19]
DeStefano

[11] Patent Number: 6,091,395
[45] Date of Patent: Jul. 18, 2000

[54] COMPUTER SYSTEM AND METHOD OF MANIPULATING A GRAPHICAL USER INTERFACE COMPONENT ON A COMPUTER DISPLAY THROUGH COLLISION WITH A POINTER

[75] Inventor: George Francis DeStefano, Rochester, Minn.

[73] Assignee: International Business Machines Corporation, Armonk, N.Y.

[21] Appl. No.: 08/990,370

[22] Filed: Dec. 15, 1997

[51] Int. Cl.[7] .............................. G09G 3/02; G06F 3/00
[52] U.S. Cl. ............................................ 345/145; 345/342
[58] Field of Search .................................. 345/340, 342, 345/332, 145

[56] References Cited

U.S. PATENT DOCUMENTS

| | | | |
|---|---|---|---|
| 4,663,616 | 5/1987 | Himelstein | 340/724 |
| 4,860,218 | 8/1989 | Sleator | 364/518 |
| 4,868,765 | 9/1989 | Diefendorff | 364/521 |
| 4,964,077 | 10/1990 | Eisen et al. | 364/900 |
| 5,122,972 | 6/1992 | Richards et al. | 395/157 |
| 5,186,629 | 2/1993 | Rohen | 434/114 |
| 5,255,356 | 10/1993 | Michelman et al. | 395/148 |
| 5,297,249 | 3/1994 | Bernstein et al. | 395/156 |
| 5,301,301 | 4/1994 | Kodosky et al. | 395/500 |
| 5,335,320 | 8/1994 | Iwata et al. | 395/155 |
| 5,361,361 | 11/1994 | Hickman et al. | 395/700 |
| 5,363,482 | 11/1994 | Victor et al. | 395/157 |
| 5,416,903 | 5/1995 | Malcolm | 395/155 |
| 5,438,662 | 8/1995 | Randall | 395/161 |
| 5,461,399 | 10/1995 | Cragun | 345/145 |
| 5,483,632 | 1/1996 | Kuwamoto et al. | 395/156 |
| 5,506,937 | 4/1996 | Ford et al. | 395/12 |
| 5,528,744 | 6/1996 | Vaughton | 395/157 |
| 5,610,828 | 3/1997 | Kodosky et al. | 364/489 |
| 5,613,134 | 3/1997 | Lucus et al. | 395/788 |
| 5,615,326 | 3/1997 | Orton et al. | 395/356 |
| 5,617,114 | 4/1997 | Bier et al. | 345/113 |
| 5,621,874 | 4/1997 | Lucas et al. | 395/761 |
| 5,644,740 | 7/1997 | Kiuchi | 395/357 |
| 5,689,642 | 11/1997 | Harkins et al. | 395/200.04 |
| 5,694,561 | 12/1997 | Malamud et al. | 395/346 |
| 5,760,772 | 6/1998 | Austin | 345/342 |
| 5,771,042 | 6/1998 | Santos-Gomez | 345/342 |

(List continued on next page.)

OTHER PUBLICATIONS

Screen Shot of Microsoft Works Software Application, (no date).
Screen Shots of Lotus Notes Software Application, (no date).
"Visualizing the Information Space of Hypermedia Systems", Graphics Visualization & Usability Center, (no date).
Elder et al., "Architecture for Platform and Presentation Independent User Interface for Applications", *IBM® Technical Disclosure Bulletin*, vol. 38, No. 1, pp. 297–302, (Jan. 1995).
Brittan, David, "MIT Reporter", *Technology Review*, pp. 12–14, (Dec. 1997).

*Primary Examiner*—Raymond J. Bayerl
*Assistant Examiner*—David E. Brown
*Attorney, Agent, or Firm*—Wood, Herron & Evans, L.L.P.

[57] ABSTRACT

A computer system and method manipulate a window or similar graphical user interface component through collision of a pointer controlled by a user with the boundary of the window. When it is determined that user manipulation of a pointer along a first vector intersects a boundary segment of a window displayed on a computer display, the boundary segment is moved along a second vector. The second vector may be identical to the first vector, or may represent only a component thereof. Moreover, either the entire boundary of the window may be moved such that the window itself is effectively moved, or one or more segments of the boundary may be maintained at a fixed location such that the window is effectively resized. In addition, this feature may be selectively enabled and/or disabled by a user. Moreover, a pointer may be defined to have a single position from which the first vector extends, or in the alternative, a pointer may also have a proximity range having a perimeter that defines the extents of the pointer, and that may or may not be coextensive with the visible shape of the pointer.

51 Claims, 12 Drawing Sheets

U.S. PATENT DOCUMENTS

| | | | |
|---|---|---|---|
| 5,796,402 | 8/1998 | Ellison-Taylor | 345/342 |
| 5,802,514 | 9/1998 | Huber | 707/4 |
| 5,808,610 | 9/1998 | Benson et al. | 345/342 |
| 5,815,151 | 9/1998 | Argiolas | 345/342 |
| 5,819,055 | 10/1998 | MacLean et al. | 395/342 |
| 5,835,088 | 11/1998 | Jaaskelainen, Jr. | 345/343 |
| 5,856,826 | 1/1999 | Carycroft | 345/346 |
| 5,874,962 | 2/1999 | de Judicibus et al. | 345/342 |
| 5,874,964 | 2/1999 | Gille | 345/356 |
| 5,880,733 | 3/1999 | Horvitz et al. | 345/355 |
| 5,894,311 | 4/1999 | Jackson | 345/440 |
| 5,900,876 | 5/1999 | Yagita et al. | 345/350 |
| 5,909,690 | 6/1999 | Tanigawa et al. | 707/526 |
| 5,912,668 | 6/1999 | Sciammarella et al. | 345/348 |
| 5,920,314 | 7/1999 | Maesano et al. | 345/340 |
| 5,937,400 | 8/1999 | Au | 706/55 |
| 5,973,702 | 10/1999 | Orton et al. | 345/433 |
| 6,002,401 | 12/1999 | Baker | 345/349 |
| 6,012,072 | 1/2000 | Lucas et al. | 707/526 |
| 6,031,989 | 2/2000 | Cordell | 395/701 |

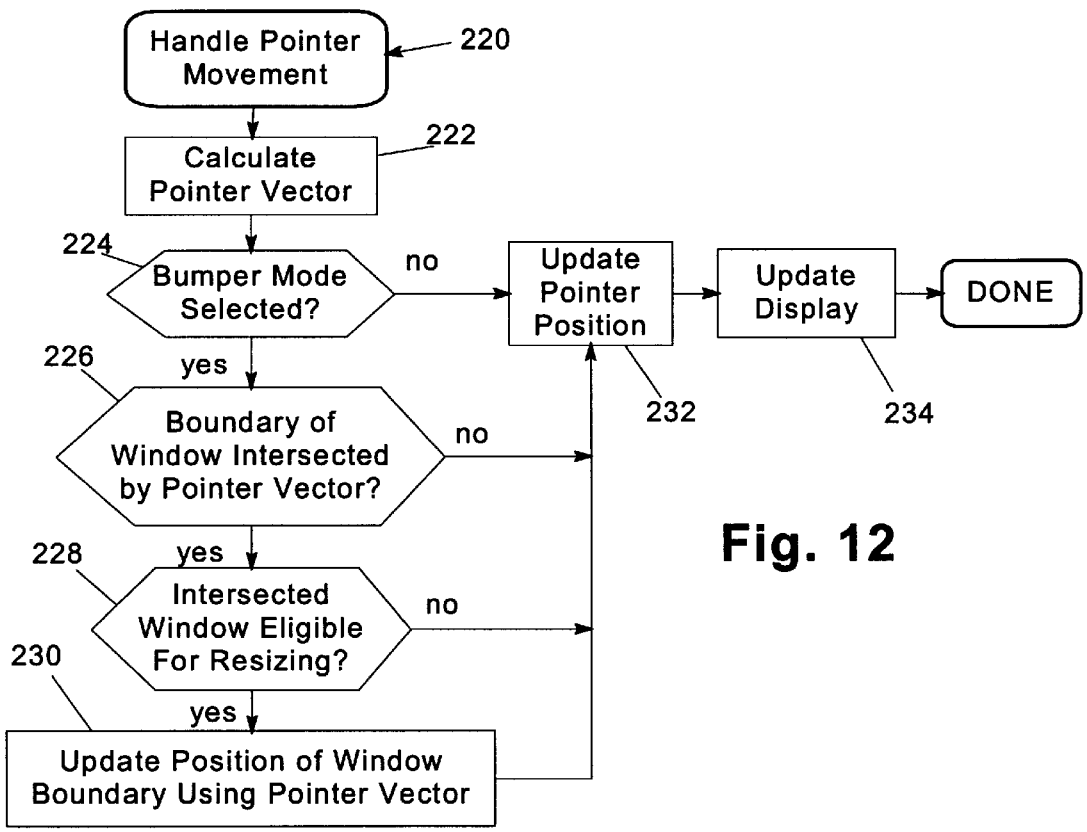
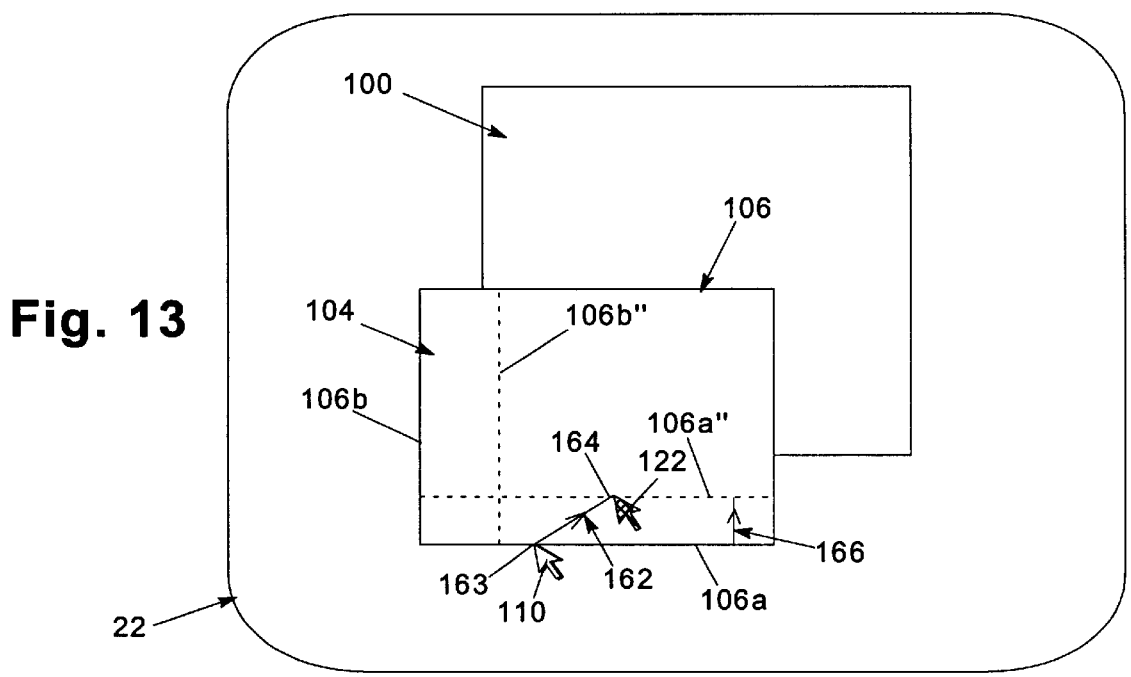

COMPUTER SYSTEM AND METHOD OF MANIPULATING A GRAPHICAL USER INTERFACE COMPONENT ON A COMPUTER DISPLAY THROUGH COLLISION WITH A POINTER

CROSS-REFERENCE TO RELATED APPLICATIONS

This application is related to the following co-pending application, which was filed on even date herewith by George Francis DeStefano: U.S. Ser. No. 08/990,304 entitled "COMPUTER SYSTEM AND METHOD OF MANIPULATING MULTIPLE GRAPHICAL USER INTERFACE COMPONENTS ON A COMPUTER DISPLAY WITH A PROXIMITY POINTER" (RO997-041). This application is hereby incorporated by reference herein.

FIELD OF THE INVENTION

The invention is generally related to computer systems and graphical user interface environments therefor. More particularly, the invention is related to user manipulation of windows and other user interface controls in a graphical user interface environment.

BACKGROUND OF THE INVENTION

As computers have become more complex and powerful, the manner in which end users or operators interface with computers has grown increasingly important. Early computers relied on switches, lights, and/or punch cards that required an end user to interact essentially in the computers' native binary languages. Eventually, video displays were developed that enabled end users to interact with computers through textual information and commands. Another significant step in this evolution was the development of graphical user interfaces (GUIs), which permitted end users to interact with computers through the more intuitive operations of "pointing and clicking" on graphical display elements with a pointer controlled by a mouse or other user interface device.

Information is often presented to an end user in a GUI environment using a graphical user interface component known as a window. A window may sometimes be used to display a relatively large document with only a portion of the document shown at any given time. Typically, scroll bar controls on the window may then be used to navigate through the document so that a user can view different portions of the document. In addition, using other controls on the window, a user may perform various operations on the window, including moving the window to another position on the display, resizing the window by moving one or more segments of its boundary, minimizing the window into an icon representation, maximizing the window to occupy the entire display, etc. Other windows, such as dialog boxes and the like, may omit one or more of the above-described controls.

Each computer software application executing in a GUI environment is typically allocated one or more windows to present information to and/or receive input from a user. Moreover, a number of computer systems provide the ability to multitask—that is, to execute more than one computer software application at the same time—such that windows from multiple applications may be displayed on a computer display simultaneously. As a result, a large number of windows may be displayed on a computer system at any given time.

Multiple windows are typically displayed in a computer system in an overlapping fashion, with the top window designated an active window associated with the computer software application to which user input will be directed. Any overlapped portions of inactive windows are hidden from the user. Inactive windows are then typically activated and brought to the top by pointing and clicking on the windows (although other possible user inputs may also be used).

Users often need to access multiple windows quickly and frequently when performing computer tasks. However, when a large number of windows are displayed at the same time on a computer display, it can often become difficult to interact with each window due to the limited space available on the computer display. Windows can become fully hidden behind other windows when the other windows are activated by pointing and clicking, and thereafter are not accessible to a user without a great deal of user interaction. Operations such as moving and resizing are also often burdensome since the controls to perform such actions are defined at specific locations on the windows. Consequently, a user may spend an inordinate amount of time manipulating windows, rather than performing the computer tasks at hand.

Therefore, a significant need exists for an improved manner of manipulating graphical user interface components such as windows and the like in a graphical user interface environment.

SUMMARY OF THE INVENTION

The invention addresses these and other problems associated with the prior art in providing a computer system and method in which a window or similar graphical user interface component is manipulated through collision of a pointer controlled by a user with the boundary of the window. Specifically, when it is determined that user manipulation of a pointer along a first vector intersects a boundary segment of a window or the like displayed on a computer display, the boundary segment is moved along a second vector. The second vector may be identical in distance and direction to the first vector, or may represent only a component thereof Moreover, either the entire boundary of the window may be moved such that the window itself is effectively moved, or one or more segments of the boundary may be maintained at a fixed location such that the window is effectively resized. In addition, this feature may be selectively enabled and/or disabled by a user.

In addition, a pointer may be defined to have a proximity range having a perimeter that defines the extents of the pointer. The perimeter may or may not be coextensive with the visible shape of the pointer. Furthermore, the use of a perimeter permits movement of a window boundary segment to be performed in response to a determination that the perimeter of the pointer intersects the boundary segment during movement of the pointer.

With many embodiments of the invention, when a user attempts to move a pointer across the boundary of a window or the like, at least a segment of the boundary of the window moves as if the pointer were pushing or "bumping" against the boundary segment. This is in contrast to many conventional GUI environments in which a pointer may often be conceptualized to "float" over the graphical user interface components displayed on a computer display such that the pointer moves freely over the computer display without interacting with the underlying components. Manipulation of such a component with a conventional floating pointer is typically performed in response to user input performed only after the pointer is located within the boundary of the component.

Therefore, embodiments consistent with the invention permit a user to more quickly and easily move and/or resize windows and the like through control of a pointer. Particularly when multiple windows or other graphical user interface components are displayed on a computer display, a user may be able to quickly "bump" such components out of the way to view the information in the hidden areas of other components, thereby facilitating access to information shown in different components.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

BRIEF DESCRIPTION OF THE DRAWING

FIG. 12 is a flowchart illustrating the program flow of another alternate handle pointer movement routine to that of FIG. 4.

FIG. 13 is a block diagram of the computer display of FIG. 6, showing resizing of the window in response to movement of the pointer across the boundary.

DETAILED DESCRIPTION

The embodiments of the invention described hereinafter manipulate graphical user interface components such as windows and the like in response to collision of a pointer, controlled by the user, with the boundaries of such components (hereinafter referred to as "collision manipulation"). As used herein, a window may include any number of graphical user interface components in which information is displayed to a user and/or from which user input is received. A window includes a boundary formed of one or more boundary segments. Typically, a window boundary is defined by four boundary segments arranged into a rectangular configuration, although other shapes (linear or curved), numbers and arrangements of boundary segments may be used in the alternative. A window may or may not include scroll bars, and further, may be defined as a modal (e.g., as with a dialog box) or modeless. In addition, other graphical user interface components may be manipulated in the same manner consistent with the invention, e.g., icons; desktop publishing design elements such as text frames, tables, images, artwork, etc.; graphical/artwork elements such as lines, boxes, circles, outlines, etc. (e.g., in painting, drawing, illustration and computer aided design (CAD) applications), among others.

A pointer may be represented by any number of conventional cursor designs, including an arrow, a cross-hair, or other graphical representation. In addition, it should be appreciated that a unique pointer may be used when in a "bumper" mode in which the collision manipulation feature is enabled so that a user is notified that the mode is enabled.

Prior to describing preferred embodiments of the invention, a brief discussion of exemplary hardware and software environments will be presented.

Hardware Environment

Figure 1:
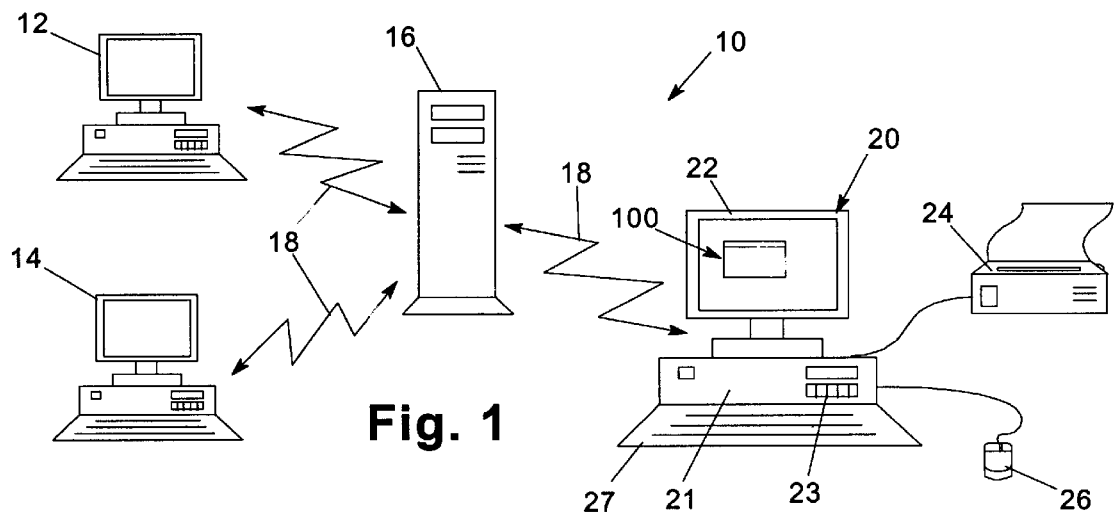
FIG. 1 is a block diagram of a computer system consistent with the invention.

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include a processor such as a microprocessor 21; a number of peripheral components such as a computer display 22; storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. Moreover, various applications, programs, objects, modules, etc. may also execute on one or more processors in server 16 or other computer systems 12, 14, e.g., in a distributed computing environment.

Computer display 22 may include any known manner of visually presenting information to a user. For example, computer display 22 may be a video monitor, e.g., a cathode-ray tube (CRT), a liquid crystal display (LCD), or a projection display, among others. In addition, other types of computer displays, including two dimensional displays that simulate three dimensions (e.g., virtual reality headsets), as well as three dimensional displays such as holographic tanks and the like, may also be used.

User input may also be received from other known user input devices. For example, control of a pointer on a display may be handled by a trackball, a joystick, a light pen, a touch sensitive pad or display, a digitizing tablet, and a keyboard, among others. In addition, many of such devices include one or more user controls such as buttons, thumb wheels, sliders and the like. Moreover, voice and/or image recognition may be used to permit a user to provide voice commands and/or gestures to provide user input to a computer system. Other user interface devices may also be used in the alternative.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Software Environment

Figure 2:
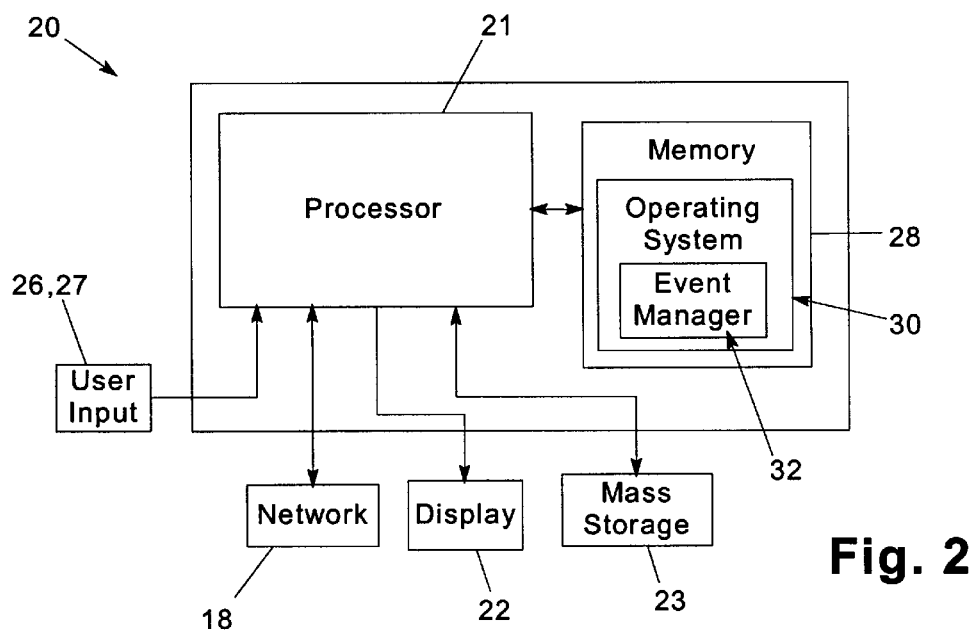
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 28 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

Computer system 10 is typically under the control of an operating system 30, a component of which is an event manager, which is illustrated at 32 and is shown as resident in memory 28. Event manager 32 generally provides in conjunction with a display manager (not shown) an event-driven graphical user interface (GUI) environment for handling the display of information to, and the receipt of input from, a user. However, it should be appreciated that routines consistent with the invention may also find use in other processes than an event manager. For example, routines consistent with the invention may find use in various computer software applications that execute on top of an operating system.

It should be appreciated that the operating system 30 and event manager 32 may be stored on network 18 or mass storage 23 prior to start-up. In addition, each may have various components that are resident at different times in any of memory 28, mass storage 23, network 18, or within registers and/or caches in processor 21 (e.g., during execution thereof).

It should also be appreciated that other software environments may be utilized in the alternative.

Collision Manipulation of Windows and the Like

Figure 3:
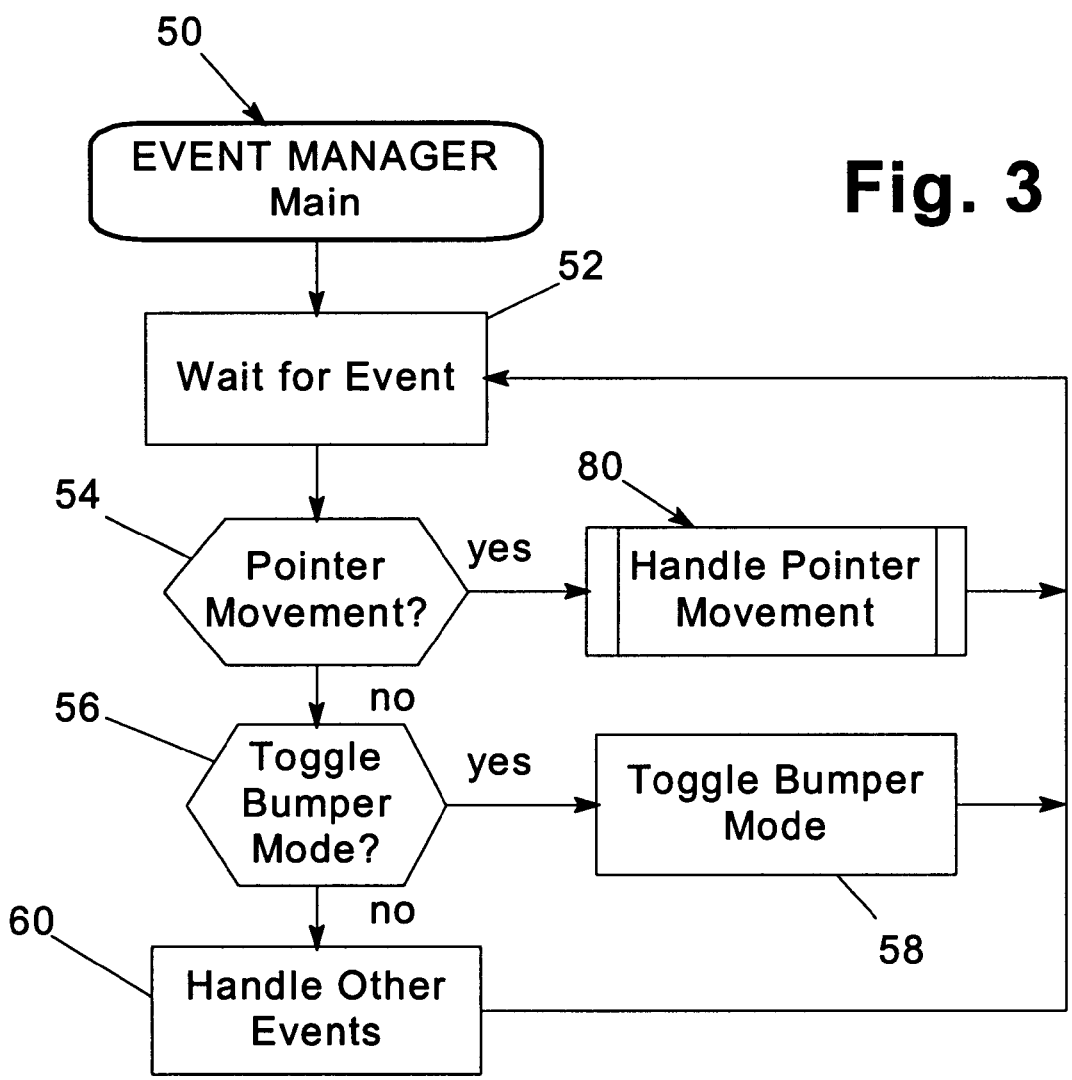
FIG. 3 is a flowchart illustrating the program flow for the main routine of an event manager consistent with the invention.

FIG. 3 illustrates an exemplary program flow for an event manager routine 50 executed by event manager 32 of FIG. 2. Routine 50 is shown implemented in an event-driven representation. However, other programming models, e.g., procedural or object-oriented models, may be used in the alternative. Moreover, the discussion hereinafter may focus on a computer system having a mouse and keyboard for providing user input to the system. It should be appreciated that the invention may be utilized with any of the other user interface devices described above, and thus the invention should not be limited to this particular hardware configuration.

Routine 50 may be considered to operate in an endless loop—typically as a dedicated process running in the background of operating system 30. As is well-known in the art, routine 50 waits for events at block 52 and passes such events to appropriate handling routines. Two such events consistent with the invention are detected at blocks 54 and 56. Also shown in FIG. 3 is a block 60 that handles the multitude of other types of events generated in the computer system, but which are not relevant to a complete understanding of the invention.

As shown at block 54, one event that may be handled by routine 50 is that of user input to move the pointer. If such an event is received, control is passed to handle pointer movement routine 80. As discussed above, a pointer movement event may be initiated by a movement of a mouse.

Typically, routine 80 is passed various information necessary to process the event. For example, routine 80 may receive information regarding a vector defining the distance and direction of movement requested by a user. The vector may be defined in terms of start and end positions, or in the alternative, may be defined by a direction and distance relative to a start (or current) position of the pointer. Routine 80 may also receive additional information such as whether any additional user input was activated during movement of the pointer, e.g., whether any keys and/or mouse buttons were depressed. Additional information, e.g., a time stamp, may also be provided to routine 80 as is well-known in the art.

Another event that may be detected in routine 50 is a request to toggle a "bumper" mode, as shown at block 56. In response to such an event, the bumper mode is toggled between enabled and disabled status in block 58, e.g., by toggling a flag between "true" and "false" values.

The bumper mode is an optional feature in which the collision manipulation feature may be selectively enabled or disabled by a user. Toggling of the bumper mode may be performed in any number of manners known in the art. For example, selection of the mode may be performed via a pull-down or pop-up menu, or by using a specific keystroke combination. Moreover, toolbar buttons or other user interface controls may be used to toggle the bumper mode. Moreover, the bumper mode may be set via a preferences or options dialog box. Other manners of selecting or de-selecting a setting on a computer system may be used in the alternative.

Consistent with the invention, a user may also be able to enable or disable the collision manipulation feature through specific keystrokes and/or button depressions during movement of the pointer. Enabling or disabling the collision manipulation feature using additional user input during movement of the pointer may be utilized in lieu of a specific bumper mode, or in the alternative, both manners of enabling and disabling the collision manipulation feature may be used concurrently, such that selection of the bumper mode effectively operates as a default mode that can be selectively enabled and/or disabled by a user through the additional input. Other manners of enabling and/or disabling a specific feature in a graphical user interface environment may be used in the alternative.

Figure 4:
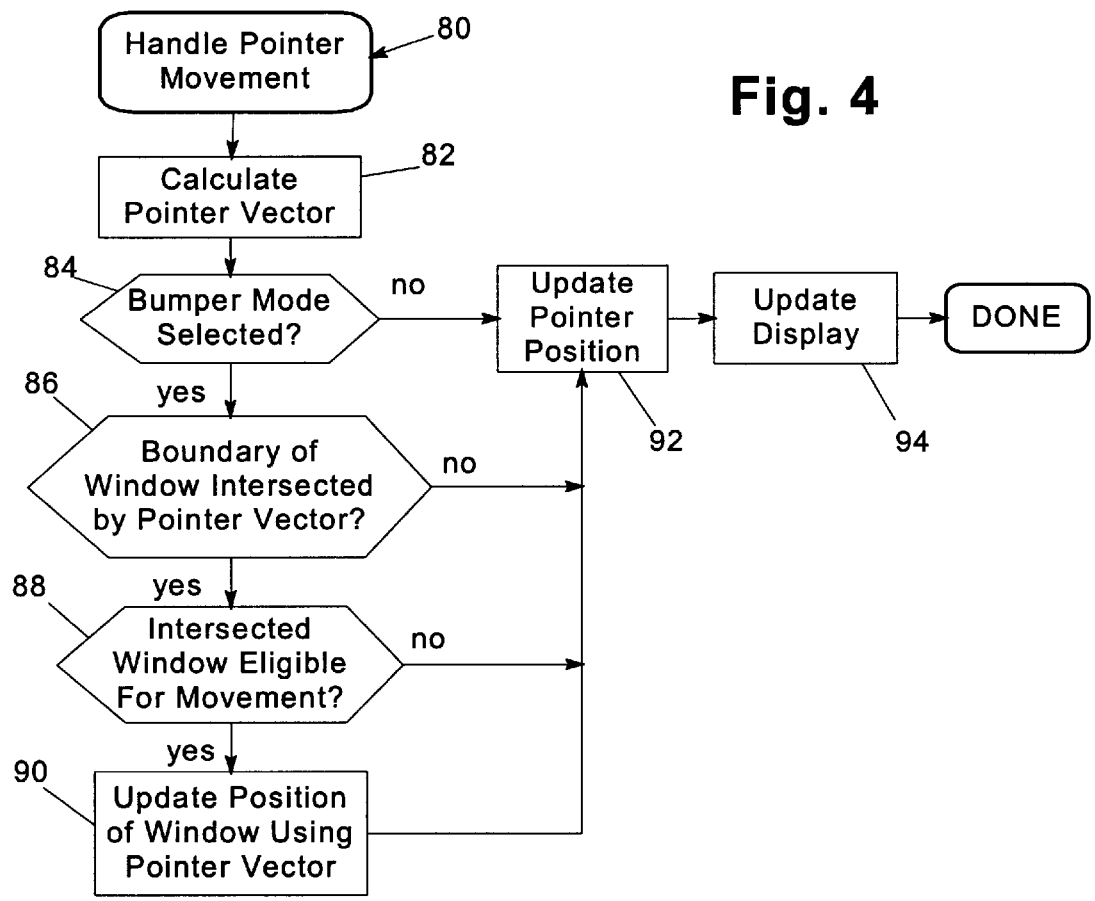
FIG. 4 is a flowchart illustrating the program flow of the handle pointer movement routine of FIG. 3.

One suitable implementation of handle pointer movement routine 80 is illustrated in FIG. 4. In this implementation, utilization of the collision manipulation feature is performed solely in response to selection of the bumper mode via the bumper mode toggling described above.

Routine 80 begins at block 82 by calculating a pointer vector. As discussed above, the pointer vector may be defined in terms of start and end positions, or in the alternative, in terms of direction and distance information relative to a start position. Moreover, the pointer vector may be directly supplied with the event, and as a result, a separate block 82 may not be required in some applications.

The pointer vector typically has a start position disposed proximate the current position of the pointer (i.e., prior to movement thereof in response to the pointer movement event). In the embodiments described in connection with FIGS. 3–13, the first vector may be considered to have a start position that is the current position pointed to by the pointer (i.e., for an arrow-shaped pointer, the location at the tip of the arrow). In other embodiments, e.g., as described below in connection with FIGS. 14–17, the first vector may be located elsewhere proximate the pointer. For example, the first vector start position may be defined along the perimeter of a proximity range for the pointer (discussed below).

Next, in block 84, it is determined whether the bumper mode has been selected. If so, block 86 is executed to determine whether the boundary of a window is intersected by the pointer vector. The boundary is typically defined as the outer perimeter of the window. The location of each segment in the boundary may be stored in the window data, or in the alternative, the extents of the boundary may be determined upon the known anchor position and horizontal and vertical sizes of the window. In either event, determination of whether the vector intersects the boundary of the window becomes a routine mathematical calculation. For example, an intersection with a boundary segment may be determined by locating points along the vector (e.g., the start and end positions) that lie on opposite sides of the boundary segment.

If the boundary of the window has been intersected, control is optionally passed to block 88 to determine whether the intersected window is eligible for movement. Block 88 may be utilized to limit which windows may be manipulated using the collision manipulation feature. For example, only the active window displayed on a computer display may be eligible for movement in certain applications. Moreover, windows may be distinguished based upon the type, e.g., whether they are dialog or non-dialog boxes. Moreover, users may be able to individually control which windows are eligible for movement through manual selection of specific windows. In the alternative, block 88 may be omitted, thereby permitting all windows to be moved at all times.

If the intersected window is eligible for movement, control is passed to block 90 to update the position of the window using the pointer vector. Typically, block 90 moves the anchor location of the window along a second vector that is related to the pointer vector. For example, it may be desirable to provide the visual effect of the window being "bumped" by the pointer such that the distance of the window vector is equivalent to the distance from the point at which the pointer intersects the boundary to the end position of the pointer vector.

Moreover, the window vector may be oriented in the same direction as the pointer vector such that the window effectively follows the pointer. In the alternative, only a component of a pointer vector (e.g., in a horizontal or vertical direction, or in a direction perpendicular or parallel to that of the boundary segment that is intersected) may be used so that movement of the window is limited only along specific axes.

It may also be desirable to vary the length of the window vector relative to the pointer vector to provide the visual effect of providing inertia to the window. In such an instance, it may be desirable to maintain velocity or acceleration information regarding the movement of the pointer such that the distance that a window is moved in response to collision with a pointer varies with the "force" of the collision. As a result, movement of the pointer across the boundary of a window may give the visual impression of the window being hit by the pointer, then slowing to a stop.

Once the position of the window has been updated, control passes to block 92 to update the pointer position using the pointer vector, in a manner well-known in the art. Next, the display is updated in block 94 such that the new positions of the window and the pointer are shown in the display—typically by signaling an event to update the display, which is handled by a separate process in a manner known in the art. Routine 80 is then complete.

As is also shown in FIG. 4, if any of the tests in blocks 84, 86 and 88 are not passed, control is diverted to block 92 such that the pointer position is updated without a corresponding update to the position of the window.

Figure 5:
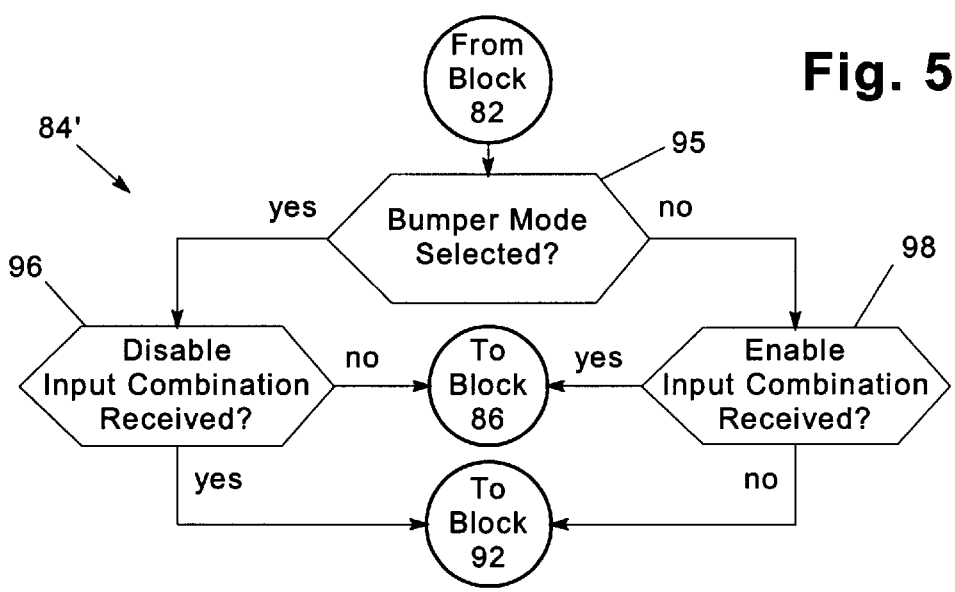
FIG. 5 is a flowchart illustrating an alternate representation of the bumper mode decision block of FIG. 4.

As discussed above, additional user input received during movement of the pointer may be used in combination with, or in lieu of, the selection of a bumper mode to activate the collision manipulation feature. For example, FIG. 5 illustrates an alternate representation 84' of block 84 of FIG. 4. Block 84' begins at block 95 by determining whether the bumper mode is selected, in much the same manner as block 84 of FIG. 4. If the bumper mode is selected, control passes to block 96 to determine whether a disable input combination has been received. If so, control is diverted to block 92 such that the pointer position is updated without a corresponding update to the position of the window. If the input combination is not received, control is passed to block 86 to continue the determination of whether a collision between the pointer and a window has occurred.

Returning to block 95, if the bumper mode is not selected, control is passed to block 98 to determine whether an enable input combination has been received. If so, control is passed to block 86. If not, control is diverted to block 92 such that the pointer position is updated without a corresponding update to the position of the window.

Any number of input combinations may be utilized for the disable and enable input combinations. For example, either input combination may be controlled via depression of one or more mouse buttons during movement of any pointer. Moreover, any number of key combinations may be utilized in lieu of or in addition to the mouse button depressions. Moreover, the disable and enable input combinations may be the same, or may be different from one another.

As one example, enabling or disabling the collision manipulation feature may be performed in response to moving the mouse pointer while depressing the left mouse button. Alternatively, enabling or disabling the collision manipulation feature may be performed in response to moving the mouse pointer while pressing a key such as the SHIFT key, the ALT key and/or the CONTROL key on the keyboard. Other mouse and/or key combinations may be used in the alternative.

It can therefore be seen that through use of a bumper mode and/or a specific combination of buttons and/or keys depressed during movement of a mouse, a user may quickly switch between a "bumper" mode in which the pointer collides with boundaries to effectively move the windows, and a "jumper" mode in which the pointer "jumps" over the boundaries of windows for which manipulation is not desired.

Figure 6:
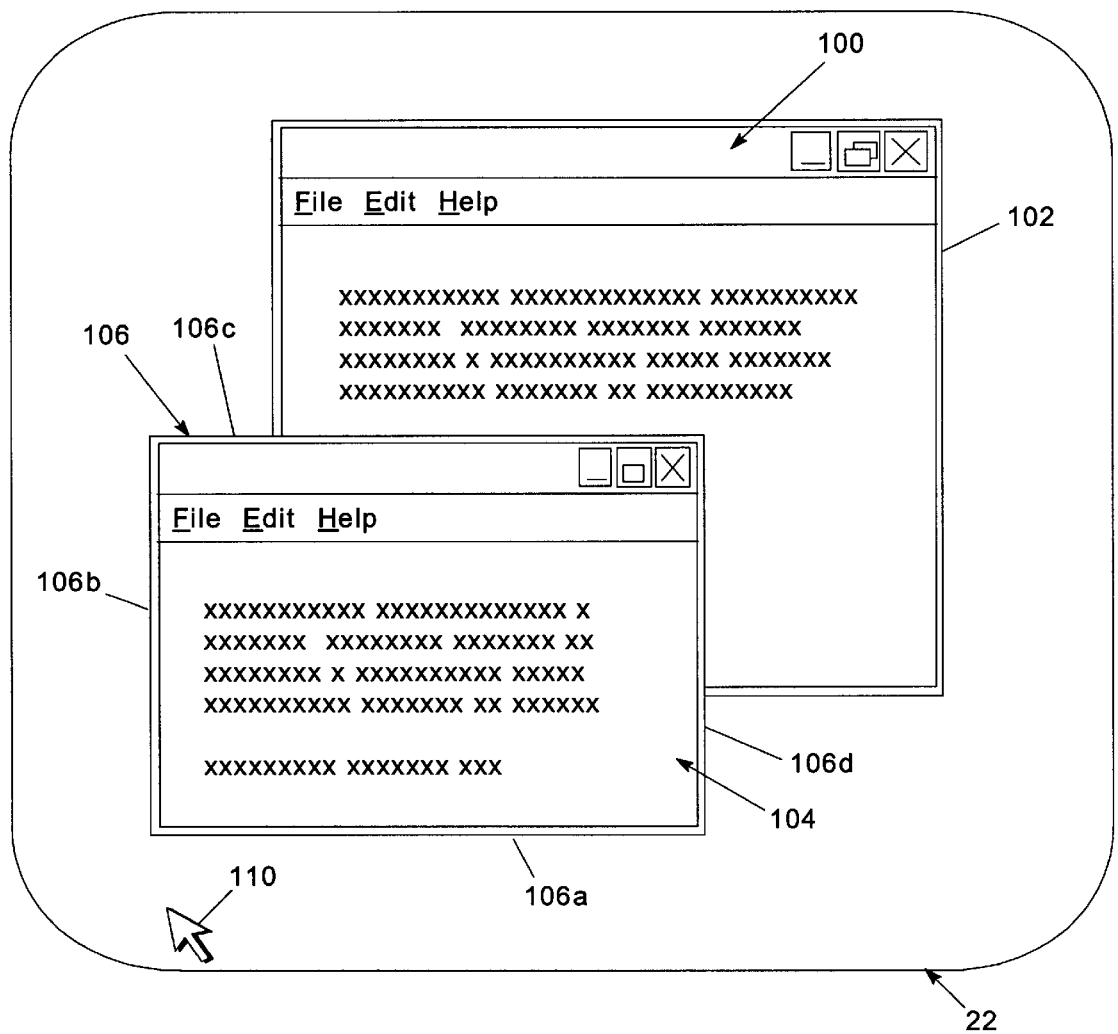
FIG. 6 is a block diagram illustrating a computer display within which is displayed a pointer and a pair of windows.

As an example of the operation of the collision manipulation feature consistent with the invention, FIG. 6 illustrates a pair of exemplary windows 100, 104 displayed on a computer display 22. Each window 100, 104 includes a boundary 102, 106. Each boundary includes one or more boundary segments, e.g., segments 106a, 106b, 106c and 106d of boundary 106. FIG. 6 also illustrates a pointer 110 that is under the control of a mouse or similar device.

Several exemplary movements of the pointer are illustrated in FIGS. 7–10 below to describe the interaction of the pointer with window 104. It should be appreciated however that to facilitate an understanding of the operation of the collision manipulation feature, the vectors of movement for the pointer are illustrated to be much larger than would generally be the case in many event-driven systems where movement of a mouse is typically checked several times a second.

Figure 7:
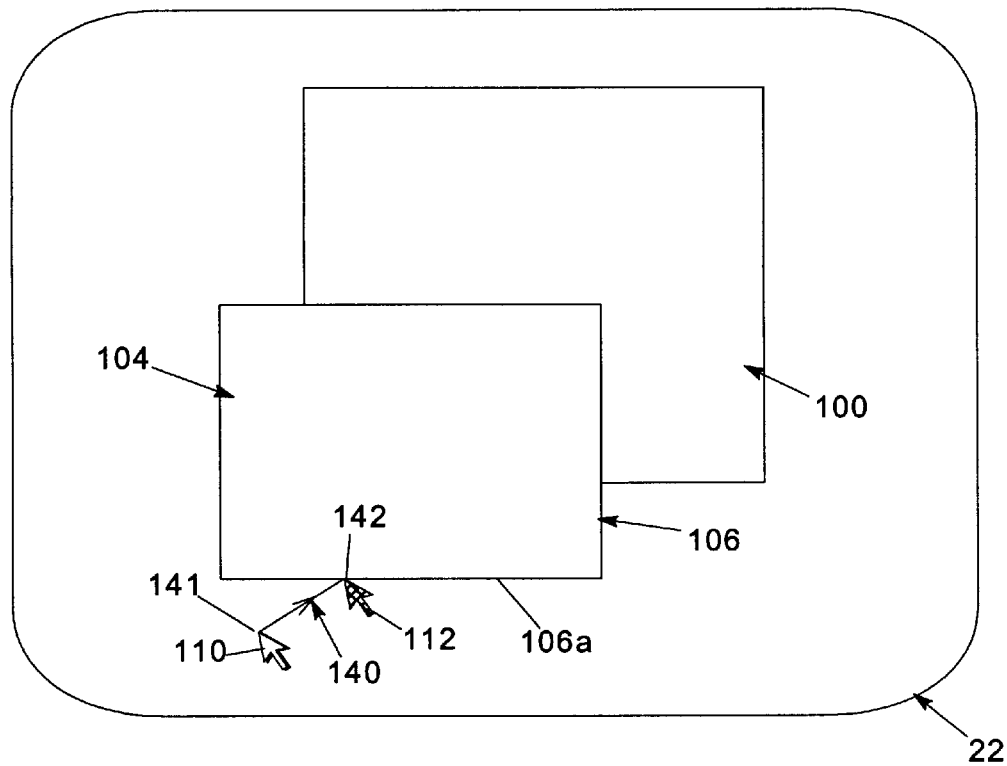
FIG. 7 is a block diagram of the computer display of FIG. 6, showing movement of the pointer outside of the boundary of a window.

As illustrated in FIG. 7, movement of pointer 110 to a position illustrated at 112 results in a pointer vector 140 having a start position 141 and an end position 142. In this instance, pointer vector 140 does not cross boundary 106 of window 104. Even assuming that the bumper mode is selected, routine 80 executes blocks 82, 84, 86, 92 and 94 in sequence to handle the movement of the pointer 110 in a conventional manner, without cooperatively moving window 104.

Figure 8:
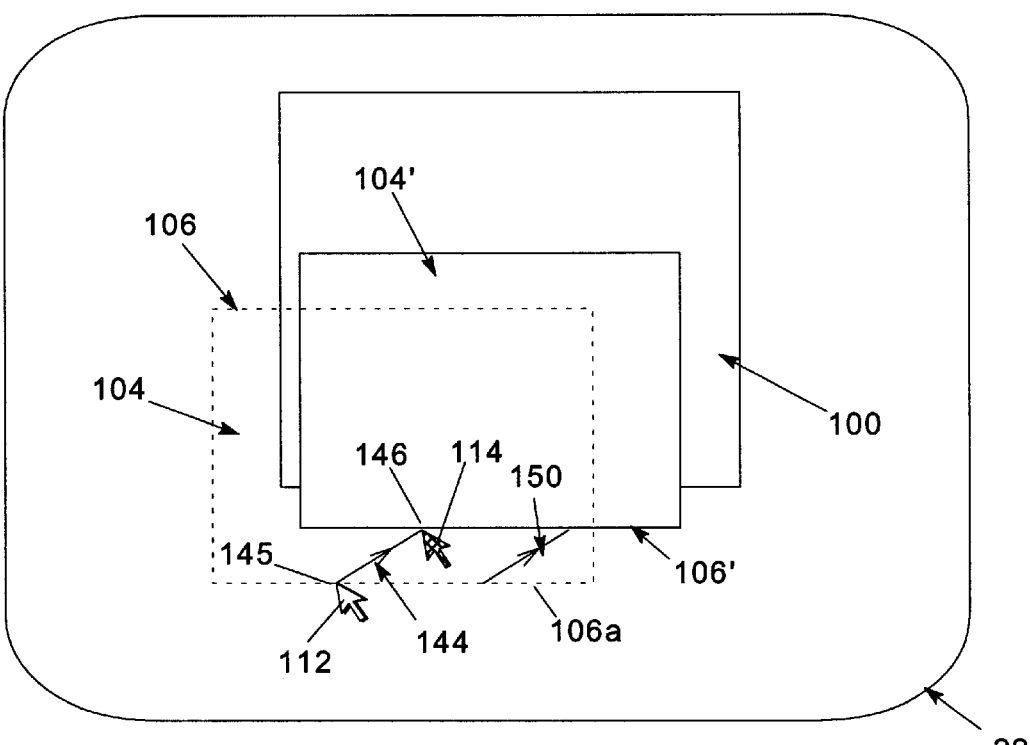
FIG. 8 is a block diagram of the computer display of FIG. 6, showing movement of the pointer across the boundary of a window with the bumper mode enabled.

As shown in FIG. 8, however, once the pointer continues to move from position 112 to position 114, the path of the pointer (defined by vector 144 having start position 145 and end position 146) intersects segment 106a of boundary 106. Assuming that the bumper mode is selected, and that window 104 is eligible to be moved, routine 80 executes blocks 82, 84, 86, 88, 90, 92 and 94 in sequence to move boundary 106 of window 104 along a window vector 150 such that boundary 106 is translated to the position illustrated at 106'. In this instance, vector 150 has the same direction and distance as vector 144.

Figure 9:
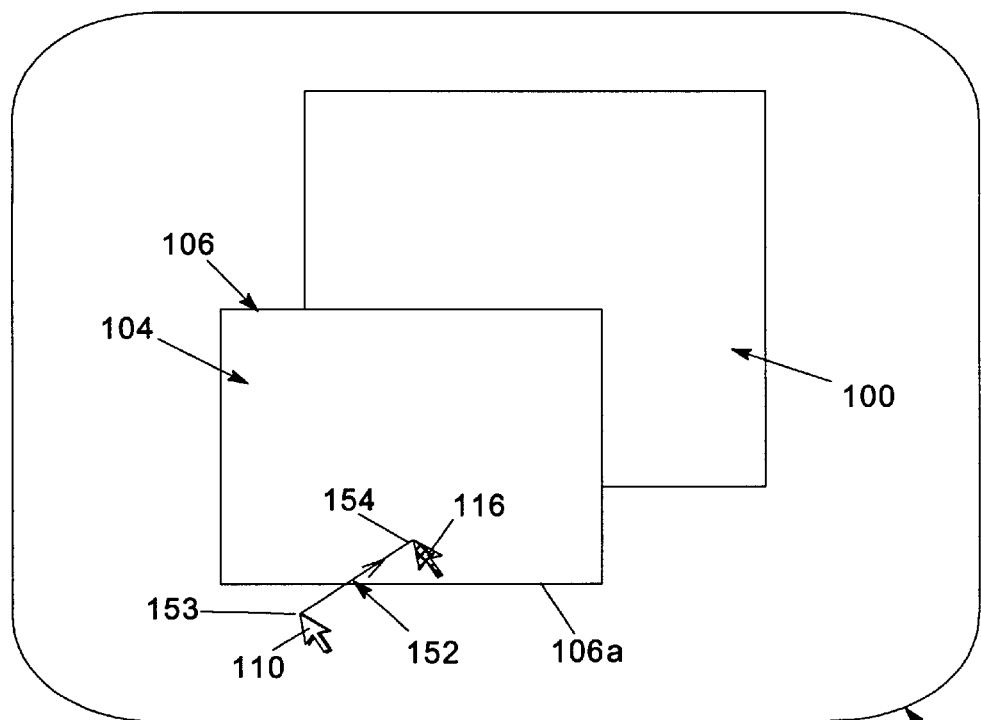
FIG. 9 is a block diagram of the computer display of FIG. 6, showing movement of the pointer across the boundary of a window with the bumper mode disabled.
Figure 10:
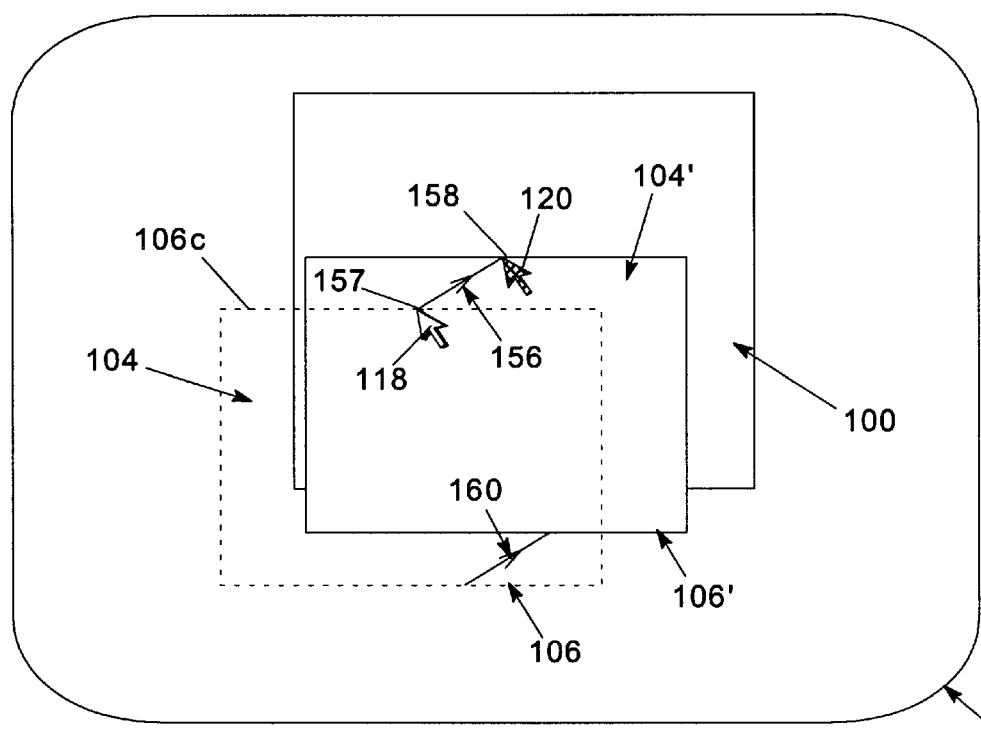
FIG. 10 is a block diagram of the computer display of FIG. 6, showing movement of the pointer from a position within the window to a position outside of the window with the bumper mode enabled.

FIG. 9 illustrates movement of pointer 100 along a vector 152 (having start position 153 and end position 154) to a position 116, while the collision manipulation feature is disabled (e.g., as a result of the bumper mode being de-selected, or the feature being disabled through a specific user input combination performed during movement of the pointer). In this instance, even though vector 152 intersects boundary segment 106a, routine 80 executes block 82, 84, 92 and 94 in sequence, and thereby does not move window 104.

After completion of the movement of pointer 110 in the manner illustrated in FIG. 9, it should be appreciated that the pointer is disposed within the boundary 106 of window 104. Movement of the pointer within the boundary does not induce a similar movement of the window; however, should the user attempt to move the pointer across the boundary 106 with the bumper mode enabled (e.g., across segment 106c thereof), routine 80 executes blocks 82, 84, 86, 88, 90, 92 and 94 in sequence, and a movement of window 104 is induced. For example, movement of the pointer from position 118 inside boundary 106, along vector 156 (having start position 157 and end position 158), and to the position illustrated at 120, results in movement of boundary 106 along a window vector 160 to a position illustrated at 106'. In this instance, window vector 160 is identical in distance and direction to pointer vector 156.

Figure 11:
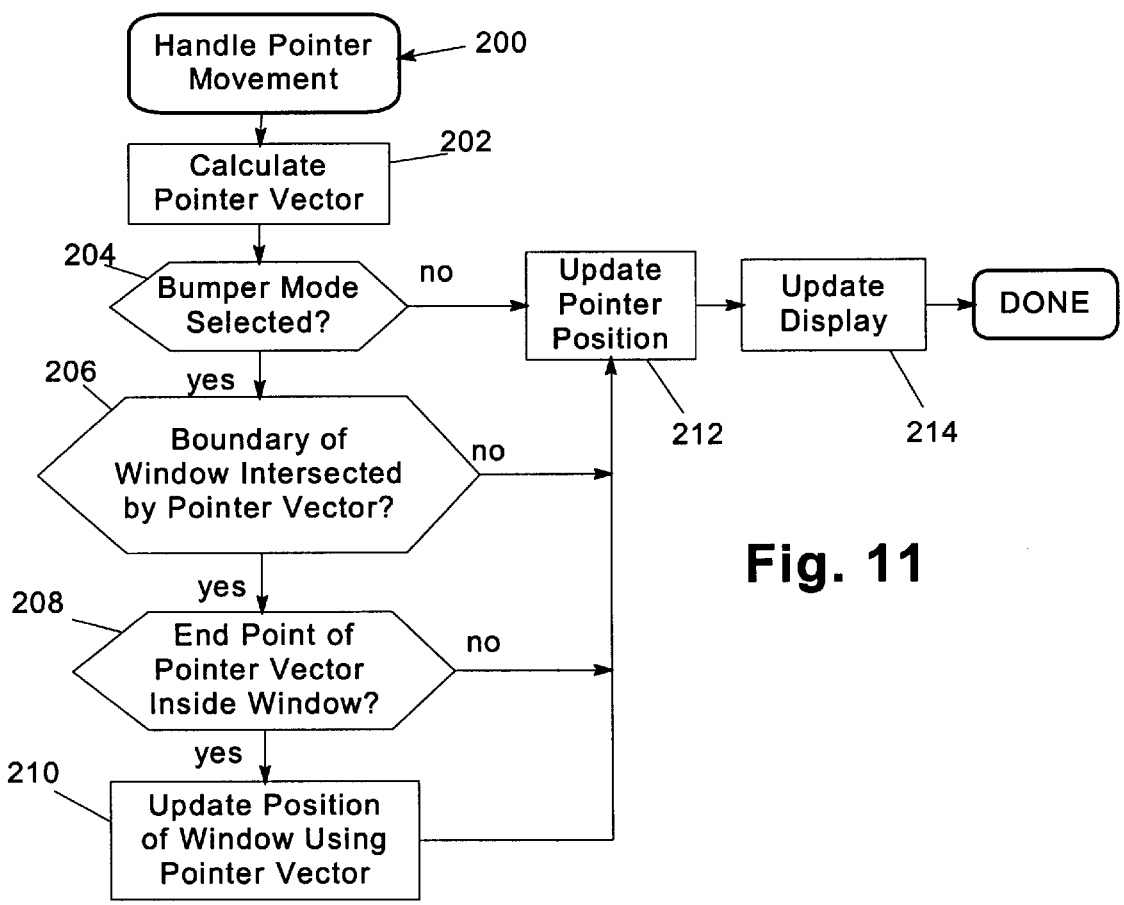
FIG. 11 is a flowchart illustrating the program flow of an alternate handle pointer movement routine to that of FIG. 4.

Various modifications may be made to the above-described embodiments without departing from the spirit and scope of the invention. For example, an alternate handle pointer movement routine 200 is illustrated in FIG. 11. Blocks 202–206 and 210–214 operate in the identical manner to blocks 82–86 and 90–94 of routine 80 (FIG. 4). Routine 200 differs, however, in that an additional condition is tested in block 208 prior to permitting the position of a window to be updated consistent with the invention. In block 208, it is determined whether the end point of the pointer vector is disposed inside of the window—that is, whether the end position of the pointer vector is disposed within the boundary of a window. In this manner, a user is permitted to move a window using the collision manipulation feature only when colliding the pointer with the outer boundary of the window. Should the user temporarily disable the collision manipulation feature to place the pointer within the boundary of a window, crossing the boundary from inside of the window to outside of the window does not result in cooperative movement of the window with the pointer.

Another alternate handle pointer routine 220 is illustrated in FIG. 12. Routine 220 illustrates a resizing function that is independent of the window movement function performed by routine 80 of FIG. 4. It should be appreciated that a resizing function may be provided concurrently with or in lieu of a window movement function consistent with the invention. Block 222–228 and 232–234 operate in the same manner as blocks 82–88 and 92–94 of routine 80 (FIG. 4). However, block 230, instead of updating the position of the window like block 90 of routine 80, updates the position of only a portion of the segments in the window boundary using the pointer vector to effectively resize the window. In this embodiment, at least one other boundary segment of the window is maintained in a fixed position such that the window is resized rather than moved.

As shown in FIG. 13, for example, movement of pointer 110 along vector 162 (having start and end positions 163 and 164) to position 122 may result in resizing of window 104 by virtue of movement of boundary segment 106 a along a vector 166 to the position illustrated in phantom at 106a". FIG. 13 also illustrates the concept that the window vector 166 need not extend in the same direction as pointer vector 162. Rather, only the vertical component of pointer vector 162 may be utilized to resize, and for that matter, to move, the window. Put another way, only the component of the pointer vector that is perpendicular or parallel to the direction of the intersected segment 106 a may be utilized in the window vector.

In the alternative, it should be appreciated that a pointer vector having both a horizontal and a vertical component may be utilized to resize more than one boundary segment at a time. For example, as shown in FIG. 13, boundary segment 106b may also be moved to the phantom position illustrated 106b" at the same time that segment 106a is moved to the position at 106a". In this instance, the window vector would have the same distance and direction as pointer vector 162, with the vertical component thereof used to move segment 106a, and the horizontal segment used to move segment 106b.

Other modifications may be made to the above-described embodiments consistent with the invention. For example, it should be appreciated that the boundary defined for a window may be different than the physical extents of the window. Rather, the boundary may be defined within the window or outside of the window.

Moreover, in other embodiments, it may be desirable to provide a "stickiness" to the window boundary such that when a pointer abuts a window boundary, the pointer may be utilized to move only that window while ignoring the boundaries of other windows until such time as the pointer no longer abuts that window. In addition, a time delay feature may be provided such that the "stickiness" property of the window may be maintained for a short time period, e.g., to permit a user to move to a separate boundary segment and continue moving the window, while ignoring other windows on the display.

In addition, it should be appreciated that when a pointer is disposed within a window, the boundaries of overlapped windows may be hidden and may be ignored. In the alternative, intersection of the boundaries of overlapped windows may still cause such windows to be moved or resized.

In general, routine 80 may be modified in any number of manners to detect and handle intersection of the pointer with multiple windows at a time. For example, as discussed above, once a boundary of one window is intersected, all other windows may be ignored until that boundary is no longer being intersected. In the alternative, other boundaries may continue to be detected, which may have the rather interesting result of multiple windows becoming aligned with one another along their intersected boundary segments. Other manners of handling multiple windows may be used in the alternative.

Proximity Range Collision Manipulation of Windows and the Like

In the embodiments described above, only collisions between a window boundary segment and a specific location on a pointer are detected insofar as the pointer vector used to determine an intersection with a boundary segment has a start position defined at the current position pointed to by the pointer. In other embodiments, however, it may be desirable to define a proximity range beyond the current position of the pointer through which interactions with window boundary segments may be detected. In such instances, collisions between the perimeter of the proximity range and a window boundary segment may be detected by anchoring the start position of one or more pointer vectors within the proximity range or along the perimeter of the pointer.

In other embodiments, collisions between the perimeter of a pointer and a window boundary segment may be detected without the use of a pointer vector. Specifically, by determining whether (1) a boundary segment crosses the perimeter of the pointer, (2) the perimeter of the pointer crosses the boundary segment, and/or (3) a portion of the boundary segment falls within the area defined by the perimeter, a collision may be detected. Other manners of detecting the overlap or collision of multiple objects may be used in the alternative.

In one embodiment, the proximity range may be coextensive with the visible extent of the pointer that is displayed on the computer display. This results in a "solid" pointer that manipulates a window in response to collisions between the window and any portion of the pointer.

In another embodiment, the proximity range extends beyond the visible extent of the pointer that is displayed on the computer display. This results in a pointer having an operation that can be analogized to the movement of a body through water, where a "wave front" of water affects other objects prior to actual contact with the body, or to the interaction between like poles of two magnets where the poles are repulsed away from one another prior to physical contact. In this embodiment, the perimeter may not be visible to the user, or may be displayed in conjunction with the display of the pointer.

The use of a proximity range with the collision manipulation feature is similar in many respects to the various proximity manipulation features described in the aforementioned co-pending U.S. Patent Application entitled "COMPUTER SYSTEM AND METHOD OF MANIPULATING MULTIPLE WINDOWS ON A COMPUTER DISPLAY WITH A PROXIMITY POINTER." It should be appreciated that any of the variations disclosed in this related application may also be utilized with the collision manipulation feature described herein.

Figure 14:
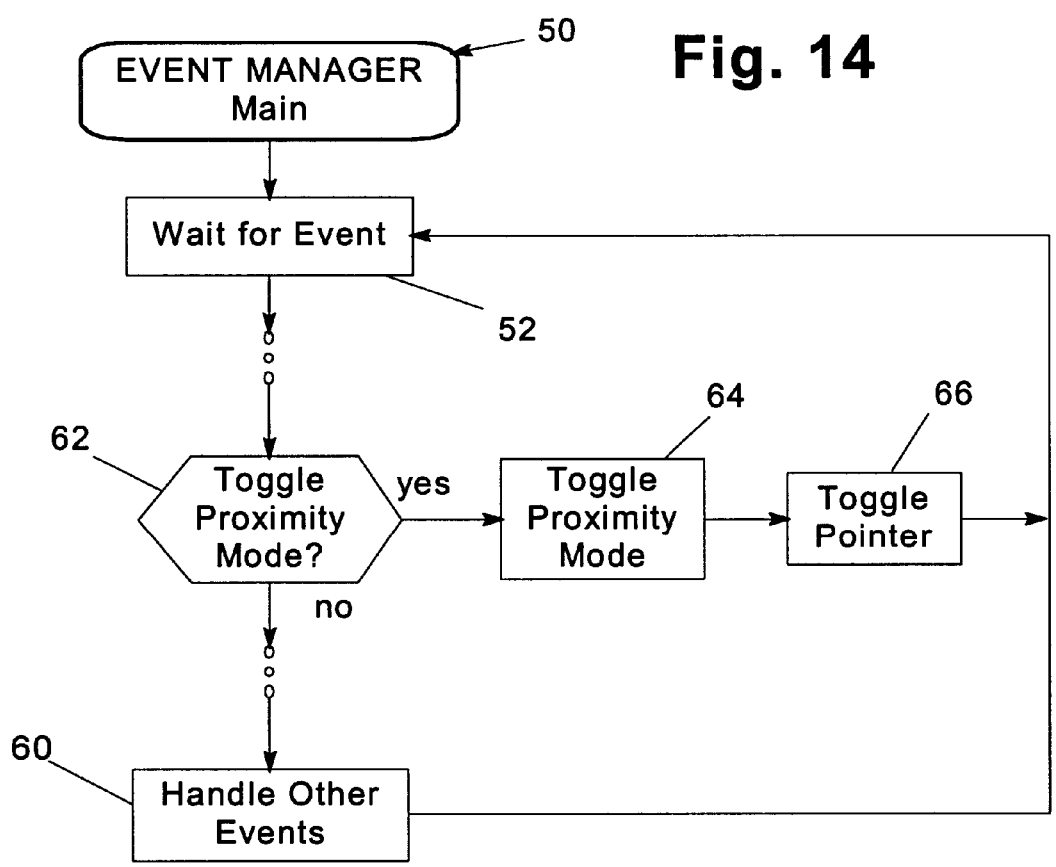
FIG. 14 is a flowchart illustrating an additional event that may be handled by the main routine of FIG. 3.
Figure 15:
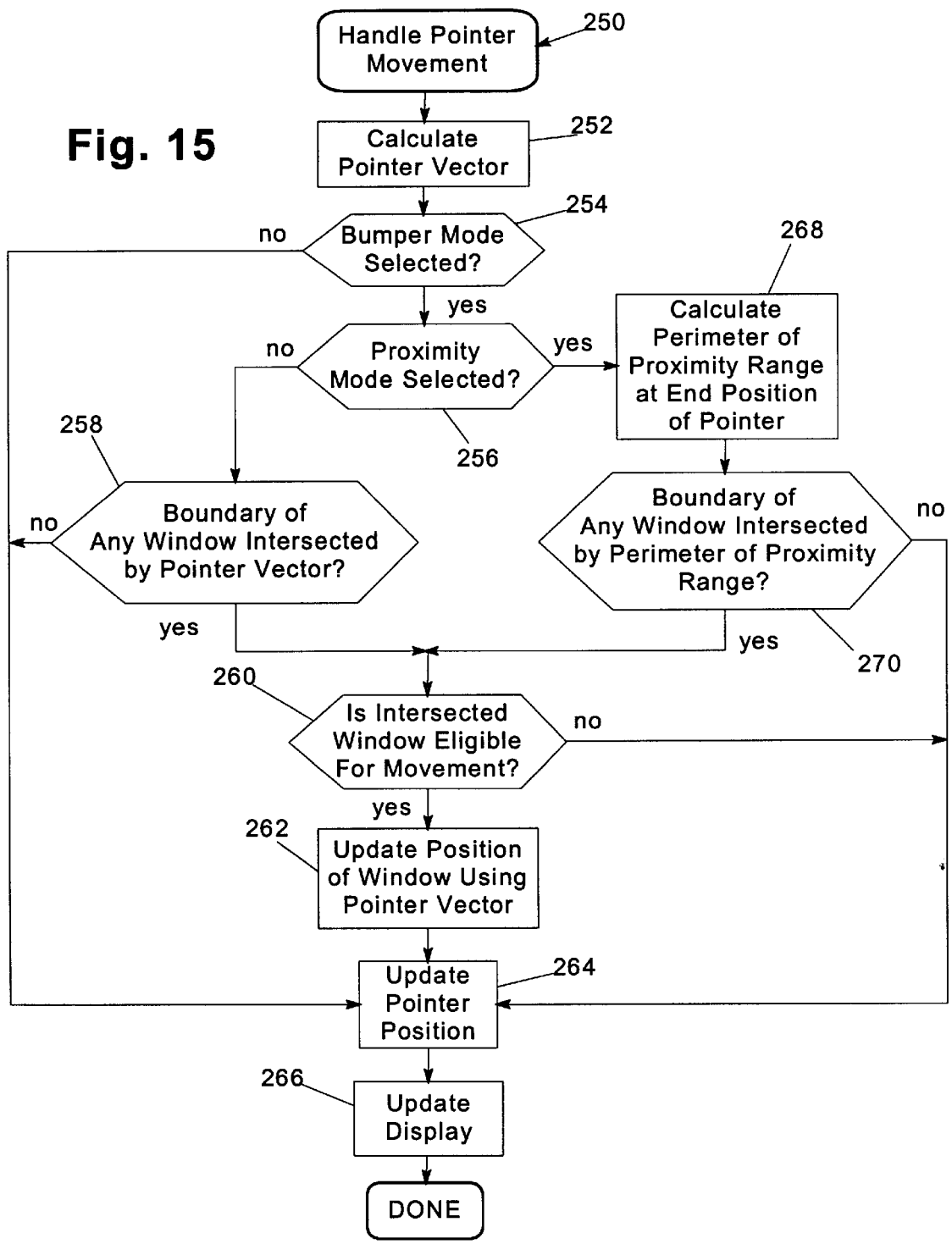
FIG. 15 is a flowchart illustrating the program flow of another alternate handle pointer movement routine to that of FIG. 4.

One implementation of a pointer with a proximity range is illustrated in FIGS. 14 and 15. In this implementation, an additional "proximity mode" feature is provided for routine 50, whereby a user is permitted to selected between a proximity mode where a perimeter is defined around the pointer, and a normal mode where no perimeter is defined and the current position pointed to by the pointer is used in the same manner as described above.

FIG. 14 illustrates an additional "toggle proximity mode" event that is handled by block 62 of routine 50. As with the bumper mode, any number of user input combinations may be utilized to toggle the proximity mode, e.g., via a pull-down or pop-up menu, a specific keystroke combination, a toolbar button, a preferences or options dialog box, etc. In response to such an event, block 64 is executed to toggle the proximity mode between "enabled" and "disabled" states.

Next, block 66 is optionally executed to toggle the pointer between proximity and non-proximity pointer representations. The proximity pointer representation is preferably distinguishable from the non-proximity representation so that a user can visually discern when the proximity mode is enabled. As discussed above, the proximity pointer representation may also display the perimeter of the proximity range if the perimeter is not coextensive with the visible extent of the pointer.

An alternate handle pointer movement routine 250 that implements a proximity mode is illustrated in greater detail in FIG. 15. Routine 250 begins by calculating a pointer vector and determining whether the bumper mode is enabled in blocks 252 and 254, in much the same manner as in blocks 82–84 of routine 80 (as shown in FIG. 4). If not, control passes to blocks 264 and 266, which operate in the same manner as blocks 92–94 of routine 80. If the bumper mode is enabled, routine 250 next determines whether the proximity mode is selected in block 256. If not, control passes to blocks 258, 260, 262, 264 and 266 to handle the bumper mode in the same manner described above for blocks 86, 88, 90, 92 and 94 of routine 80.

If the proximity mode is enabled, however, block 256 passes control to block 268 to calculate the perimeter of the proximity range at the end position of the pointer—that is, to calculate the position of the perimeter based upon the position to which it is desired to move the pointer. The perimeter may be, for example, a circle centered at the end position of the pointer and having a predetermined radius set by the user. Other perimeters may be used in the alternative, e.g., the outline of the visual representation of the pointer.

Once the perimeter has been calculated, control is passed to block 270 to determine whether the boundary of any window has been intersected by the perimeter of the proximity range for the pointer. As discussed above, this may be performed by analyzing whether a pointer vector anchored at one or more positions on the perimeter intersects a window boundary segment. In the alternative, this may be performed by analyzing whether a boundary segment crosses the perimeter, whether the perimeter crosses a boundary segment, and/or whether a boundary segment is at least partially disposed within the area defined by the perimeter, among others.

If no boundary is intersected by the pointer perimeter, control is passed to block 264. If a boundary is intersected, however, control passes to block 260 to determine whether the window is eligible for movement.

If it is not, control is passed to block 264. If it is, however, control passes to block 262 to update the position of the window using the pointer vector. In this instance, any of the above-mentioned manners of updating the position based upon the pointer vector may be used, e.g., creating a window vector that is equivalent in distance to the distance from the point at which the perimeter intersects the boundary to the end position of the pointer vector, orienting a window vector in the same direction as the pointer vector or along only a component of the pointer vector, varying the length of a window vector relative to the pointer vector to provide the visual effect of providing inertia to the window, etc.

In addition, it may also be desirable to create a window vector that moves the window in a direction that is generally perpendicular to the perimeter at the point at which the window boundary intersects the perimeter of the pointer. This type of window vector may be utilized to move a window in a natural manner that is associated with how an object would move in the physical domain were it contacted by another object having the same configuration as the perimeter of the pointer. It may also be desirable to move a window in different manners based upon whether the perimeter intersects a single boundary segment or a plurality of boundary segments.

Returning to block 262, once the position of the window has been updated, control passes to block 264 to update the pointer position, in the manner described above. Block 266 then updates the display, and routine 250 terminates.

Figure 16:
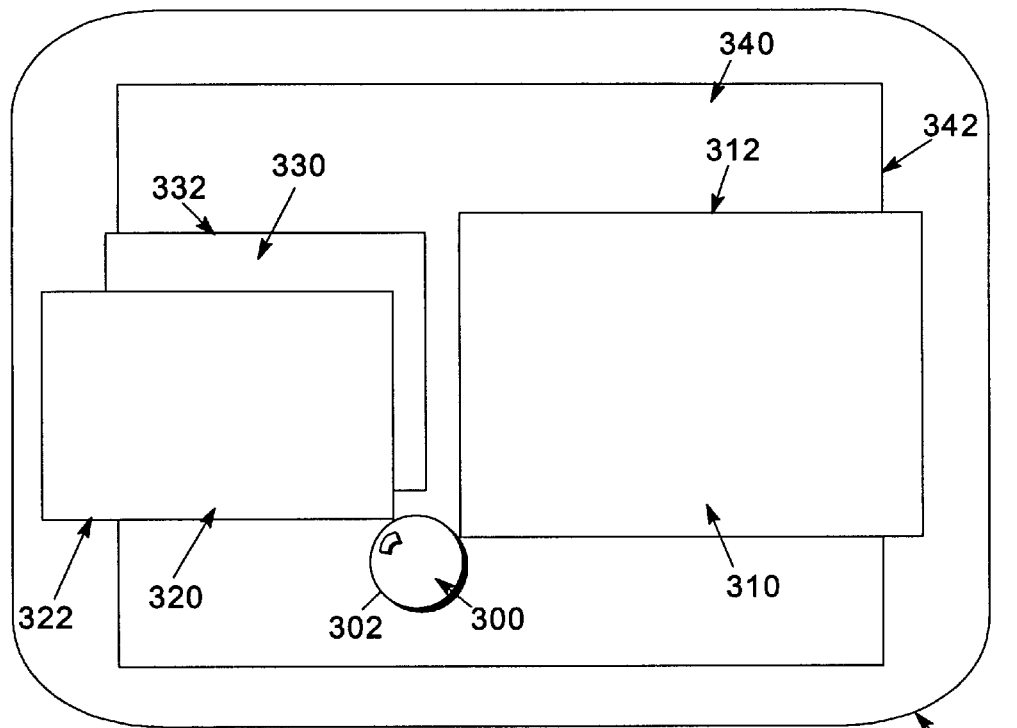
FIG. 16 is a block diagram illustrating another computer display within which is displayed a pointer and a plurality of windows.

As an example of the operation of the proximity collision manipulation feature consistent with the invention, FIG. 16 illustrates a computer display 22' upon which is displayed four windows 310, 320, 330 and 340, each having a boundary 312, 322, 332 and 342. Also illustrated is a pointer 300 having a perimeter 302 defined therefor.

Pointer 300 is illustrated in one suitable proximity representation where the perimeter is coextensive with the visual extent of the pointer. In addition, the pointer has the general appearance of a three dimensional ball. Other representations may be used in the alternative. For example, a wedge-shaped or other polygonal representation, among others, may be used to assist a user in "prying" between windows to move the windows apart consistent with the invention.

Figure 17:
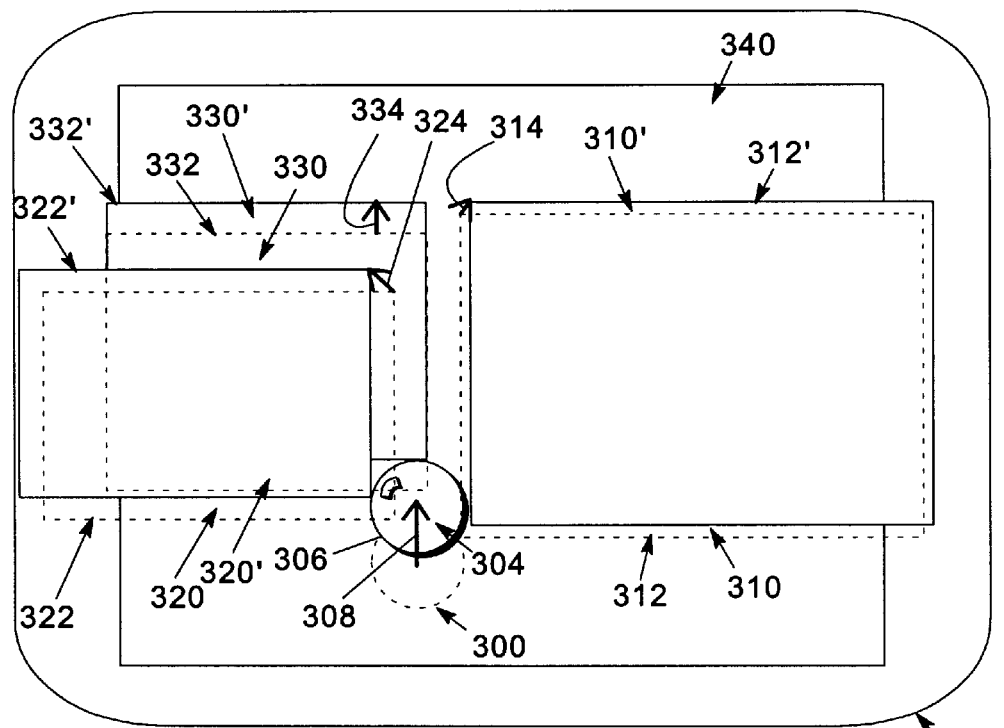
FIG. 17 is a block diagram of the computer display of FIG. 16, showing movement of the pointer in a proximity mode and the resulting movement of windows affected thereby.

FIG. 17 illustrates the movement of windows 310–330 in response to movement of the pointer along a vector 308 to a position illustrated at 304. In response to this pointer movement, a perimeter as defined at 306 is calculated by routine 250. As may be seen from the figure, the boundary of each of windows 310–330 intersects perimeter 306. As such, each is moved along a dedicated window vector as if each were "bumped" by the perimeter of the pointer. For example, window 310 is moved along window vector 314 to position 310' (with boundary 312 translated to position 312'). Similarly, window 320 is moved along window vector 324 to position 320' (with boundary 322 translated to position 322'), and window 330 is moved along window vector 334 to position 330' (with boundary 332 translated to position 332').

For each window in FIG. 17, the direction of the window vector is set to a direction perpendicular to the orientation of the perimeter at a point of contact with the window boundary. Therefore, for the circular perimeter defined for the pointer in FIG. 17, the direction of each window vector may be calculated by determining the direction of a radial line extending from the center of the perimeter to the point of contact with the boundary. Any of the other manners of generating a window vector as described above may be used in the alternative.

Various additional modifications may be made consistent with the invention. For example, routine 250 may be modified to perform a resizing operation similar to routine 220 of FIG. 12. Moreover, routine 250 may be modified to detect and handle the concurrent collision of the perimeter with multiple windows. Furthermore, any of the other variations described above may be utilized with a proximity-based collision feature consistent with the invention.

Among the innumerable applications of the collision manipulation feature in graphical user interface environments such as for operating systems as well as specific computer software applications, one specific use of the feature is in an abstraction stack application. Generally, an abstraction stack represents information from a body of knowledge (BOK), which typically represents a collection of information related to a particular subject of interest. A body of knowledge is delimited into a plurality of levels of abstraction, each of which typically represents a particular manner of looking at a given body of knowledge. An abstraction stack concurrently displays multiple information elements associated with different levels of abstraction on a computer display, and visually links the information elements on the computer display in a three dimensional workspace to represent a hierarchical arrangement of the levels of abstraction.

Figure 18:
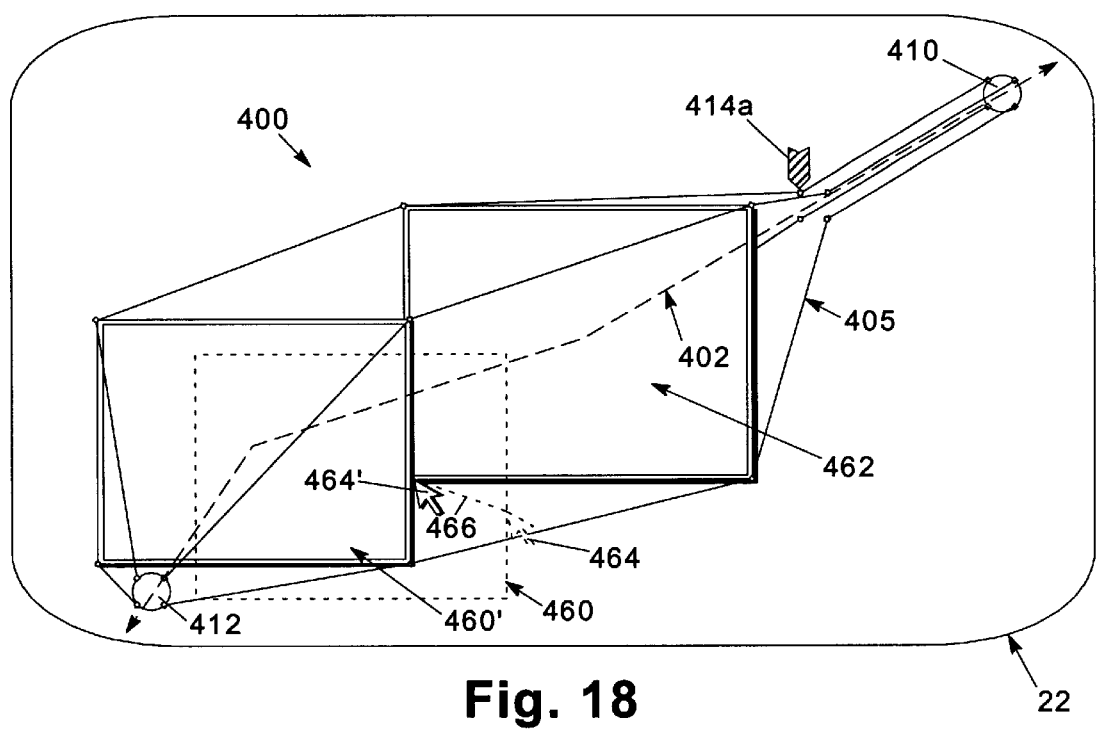
FIG. 18 is a block diagram of a computer display, showing an abstraction stack consistent with the invention.

For example, FIG. 18 illustrates an abstraction stack 400 including a plurality of rendered objects defined along a depth vector 402. A pair of compass handles 410, 412 define the end of the abstraction stack, with intermediate objects such as an intersection point 414a and lenses 460 and 462 interposed therebetween. Intersection point 414 a represents a level of abstraction for the body of knowledge, and each lens is defined with a specific filter configuration that displays information from one or more levels of abstraction in the body of knowledge. Binder bands 405 extend between the objects disposed along the depth vector to assist in providing a visual representation of the hierarchical relationship of the objects in a three dimensional workspace.

In an abstraction stack, it is possible for one lens (e.g., lens 460) to overlap another lens (e.g., lens 462) and thereby hide a portion of the information presented in the overlapped lens. However, so that the hierarchical relationship of the rendered objects is maintained, it is preferable to not permit lens 462 to overlap lens 460 (e.g., as would be the case if lens 460 corresponded to a conventional GUI window that could be activated through user selection thereof and brought to the top layer of the display). Therefore, consistent with the invention, it is possible when in a collision manipulation mode to move pointer 464, e.g., along a vector 466 to the position illustrated at 464', to effect movement of lens 460 to the position illustrated at 460' and thereby reveal the hidden information in lens 462.

It should be appreciated, however, that the invention should not be limited to use solely in conjunction with an abstraction stack application.

The various embodiments described above have several unique advantages over conventional graphical user interface environments. The ability to "bump" windows or other components out of the way provides a uniquely different conceptual environment for a user, i.e., "get this thing out of the way" instead of "put this thing at this location". Typically, a user is not required to change the "active" window or other component back and forth between an obstructing component and an at least partially hidden component. Thus, as opposed to moving components by grabbing and dragging techniques, a user is not required to shift his or her attention or focus away from the hidden information the user is attempting to access. Moreover, as opposed to raising hidden information by pointing and clicking techniques, formerly obstructing components are not necessarily obstructed when the hidden information is accessed. Other advantages should be apparent to one skilled in the art.

It should be appreciated that any of the above-described variations may be utilized individually or in combination with other variations described herein. Moreover, other modifications may be made to the embodiments described herein without departing from the spirit and scope of the invention. Therefore, the invention lies solely in the claims hereinafter appended.

What is claimed is:

1. A method of manipulating a window on a computer display, the method comprising:
   (a) displaying a window on a computer display, the window including a boundary including at least one boundary segment;
   (b) displaying a pointer on the computer display;
   (c) receiving user input to move the pointer along a first vector;
   (d) determining whether the first vector intersects the boundary segment of the window; and
   (e) in response to determining that the first vector intersects the boundary segment of the window, moving at least the boundary segment of the window along a second vector, wherein moving at least the boundary segment of the window responsive to the determination that the first vector intersects the boundary segment is further responsive to user selection of a predetermined mode.

2. The method of claim 1, further comprising selectively disabling moving of at least the boundary segment of the window in response to additional user input during movement of the pointer.

3. A computer system, comprising:
   (a) a computer display upon which is displayed a window and a pointer, the window including a boundary including at least one boundary segment;
   (b) a user input device configured to receive user input; and
   (c) a processor, coupled to the computer display and the user input device, the processor configured to initiate a collision manipulation operation, to receive user input to move the pointer along a first vector after initiation of the collision manipulation operation, and, in response to receiving user input to move the pointer along a the first vector, to move at least the boundary segment of the window along a second vector if the first vector intersects the boundary segment of the window.

4. The computer system of claim 3, wherein a start position of the first vector is disposed outside of the window.

5. The computer system of claim 3, wherein the processor is configured to move at least the boundary segment of the window by moving the window.

6. The computer system of claim 3, wherein the processor is configured to move at least the boundary segment of the window by resizing the window and maintaining at least one additional boundary segment in the boundary at a fixed location.

7. The computer system of claim 3, wherein the second vector extends in the same direction as the first vector.

8. The computer system of claim 3, wherein the second vector is perpendicular to the boundary segment.

9. The computer system of claim 3, wherein the processor is configured to move at least the boundary segment of the window further responsive to receipt of additional user input.

10. The computer system of claim 3, wherein the processor is configured to move at least the boundary segment of the window further responsive to a predetermined characteristic of the window.

11. The computer system of claim 3, wherein the processor is configured to move at least the boundary segment of the window further responsive to a direction of the first vector relative to the boundary segment.

12. The computer system of claim 3, wherein the pointer includes a proximity range having a perimeter, a portion of which is spaced from a current position pointed to by the pointer, and wherein the first vector has a start position defined along the perimeter of the proximity range.

13. A program product, comprising:
   (a) a program configured to perform a method of manipulating a window on a computer display, the method comprising:
      (1) displaying a window on a computer display, the window including a boundary including at least one boundary segment;
      (2) displaying a pointer on the computer display;
      (3) initiating a collision manipulation operation;
      (4) receiving user input to move the pointer along a first vector after initiation of the collision manipulation operation; and (5) in response to receiving user input to move the pointer along the first vector, moving at least the boundary segment of the window along a second vector if the first vector intersects the boundary segment of the window; and (b) a signal bearing media bearing the program.

14. The program product of claim 13, wherein the signal bearing media is transmission type media.

15. The program product of claim 13, wherein the signal bearing media is recordable media.

16. A method of manipulating a graphical user interface component on a computer display, the method comprising:

(a) displaying a graphical user interface component on a computer display, the graphical user interface component including a boundary including at least one boundary segment;

(b) displaying a pointer on the computer display;

(c) initiating a collision manipulation operation;

(d) receiving user input to move the pointer along a first vector after initiation of the collision manipulation operation; and (e) in response to receiving the user input to move the pointer along the first vector, moving at least the boundary segment of the graphical user interface component along a second vector if the first vector intersects the boundary segment of the window.

17. The method of claim 16, wherein the graphical user interface component includes a window.

18. A method of manipulating a window on a computer display, the method comprising:

(a) displaying a window on a computer display, the window including a boundary;

(b) displaying a pointer on the computer display, the pointer including a perimeter defining a proximity range around the pointer, wherein the perimeter extends beyond a visible extent of the pointer displayed on the computer display;

(c) moving the pointer in response to user input;

(d) determining whether the perimeter of the pointer intersects the boundary of the window during movement of the pointer; and (e) manipulating the window responsive to determining that the perimeter of the pointer intersects the boundary of the window during movement of the pointer.

19. The method of claim 18, wherein manipulating the window includes moving the window.

20. The method of claim 18, wherein manipulating the window includes resizing the window.

21. The method of claim 18, wherein the perimeter is coextensive with a visible extent of the pointer displayed on the computer display.

22. The method of claim 18, wherein the window boundary includes at least one boundary segment, wherein the pointer moves along a first vector having a start position disposed on the perimeter of the pointer, and wherein manipulating the window is performed in response to the first vector intersecting the boundary segment of the window.

23. A computer system, comprising:

(a) a computer display upon which is displayed a window and a pointer, the window including a boundary, and the pointer including a perimeter defining a proximity range around the pointer, wherein the perimeter extends beyond a visible extent of the pointer displayed on the computer display;

(b) a user input device configured to receive user input; and (c) a processor, coupled to the computer display and the user input device, the processor configured to move the pointer in response to user input, to determine whether the perimeter of the pointer intersects the boundary of the window during movement of the pointer, and, responsive to a determination that the perimeter of the pointer intersects the boundary of the window during movement of the pointer, to manipulate the window.

24. The computer system of claim 23, wherein the processor is configured to manipulate the window by moving the window.

25. The computer system of claim 23, wherein the processor is configured to manipulate the window by resizing the window.

26. The computer system of claim 23, wherein the perimeter is coextensive with a visible extent of the pointer displayed on the computer display.

27. The computer system of claim 23, wherein the window boundary includes at least one boundary segment, wherein the pointer moves along a first vector having a start position disposed on the perimeter of the pointer, and wherein the processor is configured to manipulate the window in response to the first vector intersecting the boundary segment of the window.

28. A program product, comprising:

(a) a program configured to perform a method of manipulating a window on a computer display, the method comprising:

(1) displaying a window on a computer display, the window including a boundary;

(2) displaying a pointer on the computer display, the pointer including a perimeter defining a proximity range around the pointer, wherein the perimeter extends beyond a visible extent of the pointer displayed on the computer display;

(3) moving the pointer in response to user input;

(4) determining whether the perimeter of the pointer intersects the boundary of the window during movement of the pointer; and (5) manipulating the window responsive to determining that the perimeter of the pointer intersects the boundary of the window during movement of the pointer; and (b) a signal bearing media bearing the program.

29. The program product of claim 28, wherein the signal bearing media is transmission type media.

30. The program product of claim 28, wherein the signal bearing media is recordable media.

31. A method of manipulating a window on a computer display, the method comprising:

(a) displaying a window on a computer display, the window including a boundary including at least one boundary segment;

(b) displaying a pointer on the computer display;

(c) initiating a collision manipulation operation;

(d) receiving user input to move the pointer along a first vector after initiation of the collision manipulation operation; and (e) in response to receiving the user input to move the pointer along the first vector, moving at least the boundary segment of the window along a second vector if the first vector intersects the boundary segment of the window.

32. The method of claim 31, wherein a start position of the first vector is disposed outside of the window.

33. The method of claim 31, wherein moving at least the boundary segment of the window includes moving the window.

34. The method of claim 31, wherein moving at least the boundary segment of the window includes resizing the window by maintaining at least one additional boundary segment in the boundary at a fixed location.

35. The method of claim 31, wherein the second vector extends in the same direction as the first vector.

36. The method of claim 31, wherein the second vector is perpendicular to the boundary segment.

37. The method of claim 31, wherein the second vector has a length that is substantially equal to the distance between an end position of the first vector and an intersection point between the boundary segment and the first vector.

38. The method of claim 31, wherein the second vector has a length that is based on a component of the first vector that extends perpendicular to the boundary segment.

39. The method of claim 31, wherein moving at least the boundary segment of the window responsive to the determination that the first vector intersects the boundary segment is further responsive to receipt of additional user input.

40. The method of claim 39, wherein the additional user input includes depressing a mouse button.

41. The method of claim 39, wherein the additional user input includes depressing a key.

42. The method of claim 41, wherein the key is selected from the group consisting of a SHIFT key, a CONTROL key, an ALT key, and combinations thereof.

43. The method of claim 31, wherein moving of at least the boundary segment of the window is further responsive to a predetermined characteristic of the window.

44. The method of claim 43, wherein the predetermined characteristic includes an active status of the window.

45. The method of claim 31, wherein moving of at least the boundary segment of the window is further responsive to a direction of the first vector relative to the boundary segment.

46. The method of claim 45, wherein moving at least the boundary segment of the window is performed only when an end position of the first vector is disposed within the window.

47. The method of claim 31, wherein moving at least the boundary segment of the window includes updating a position of the window, the method further comprising refreshing the computer display.

48. The method of claim 47, wherein receiving user input to move the pointer includes updating a position of the pointer prior to refreshing the computer display.

49. The method of claim 31, wherein the first vector has a start position defined at a current position pointed to by the pointer.

50. The method of claim 31, wherein the pointer includes a proximity range having a perimeter, a portion of which is spaced from a current position pointed to by the pointer, and wherein the first vector has a start position defined along the perimeter of the proximity range.

51. A method of manipulating a window on a computer display, the method comprising:

(a) displaying a window on a computer display, the window including a boundary including at least one boundary segment;

(b) displaying a pointer on the computer display, wherein the pointer includes a proximity range having a perimeter, a portion of which is spaced from a current position pointed to by the pointer;

(c) receiving user input to move the pointer along a first vector, wherein the first vector has a start position defined along the perimeter of the proximity range; and (d) in response to receiving the user input to move the pointer along the first vector, moving at least the boundary segment of the window along a second vector if the first vector intersects the boundary segment of the window.

* * * * *